United States Patent

[11] 3,590,427

| [72] | Inventor | Maharaj Krishen Mehta<br>Cardiff, Wales |
|---|---|---|
| [21] | Appl. No. | 755,420 |
| [22] | Filed | Aug. 26, 1968 |
| [45] | Patented | July 6, 1971 |
| [73] | Assignee | P. Leiner & Sons (Encapsulations) Limited<br>Treforest, Glamorganshire, Wales |
| [32] | Priority | Sept. 22, 1967 |
| [33] | | Great Britain |
| [31] | | 43,312/67 |

[54] MACHINE FOR FORMING CAPSULES
10 Claims, 1 Drawing Fig.

[52] U.S. Cl. .................................................. 18/5 R,
18/5 BF, 18/14 A
[51] Int. Cl. ........................................................ B29d 23/04
[50] Field of Search........................................... 18/5 BF, 5
R, 1 C, 14 A, 14 C, 14 G, 14 S

[56] References Cited
UNITED STATES PATENTS

| 2,503,171 | 4/1950 | Posner............................ | 18/5 (BF) X |
| 2,616,126 | 11/1952 | Merck et al..................... | 18/14 (I) |
| 2,958,171 | 11/1960 | Deckers ........................ | 18/(5 BF UX) |
| 3,144,494 | 8/1964 | Geron ............................ | 18/(14 A UX) |
| 3,296,345 | 1/1967 | Dietz.............................. | 18/(5 BF UX) |
| 3,331,902 | 7/1967 | Stark.............................. | 18/5 (BF) X |

FOREIGN PATENTS

| 1,180,301 | 10/1964 | Germany........................ | 18/5 (BF) |
| 284,490 | 1/1965 | Netherlands................... | 18/5 (BF) |

Primary Examiner—J. Spencer Overholser
Assistant Examiner—Michael O. Sutton
Attorney—Woodhams, Blanchard and Flynn ABSTRACT: A method of and apparatus for forming filled gelatine capsules by extruding a tube, sealing together the walls of the tube to form one end of the capsule, filling the capsule through the open end of the tube, sealing off the open end and detaching the capsule from the tube before repeating the process to form a further capsule.

PATENTED JUL 6 1971
3,590,427
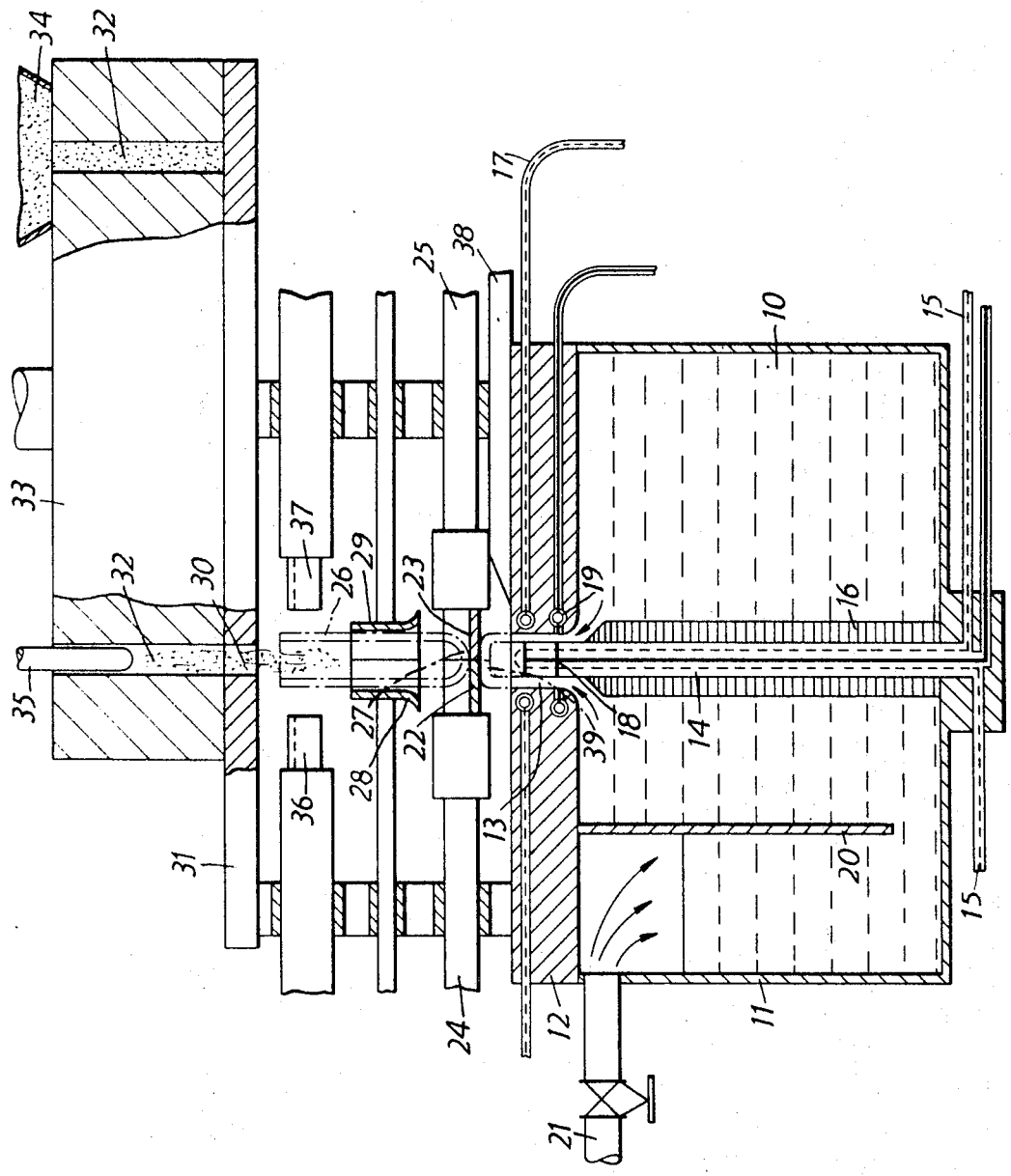
INVENTOR
MAHARAJ KRISHEN MEHTA
BY
Woodhams, Blanchard & Flynn
ATTORNEYS

MACHINE FOR FORMING CAPSULES

The present invention relates to the formation of filled capsules from gelatine and other thermoplastic materials.

The usual method of forming such capsules is to manufacture two ribbons from molten gelatine, form capsule halves in the ribbons by means of cavities in cylindrical rotary dies or flat reciprocating dies, fill the capsule halves, and then seal together the capsule halves to complete the capsules. This requires complex machinery for the formation of the gelatine sheet in order to ensure close control over the thickness and mechanical properties of the sheet. It also requires dies having a number of accurately machined cavities which have to be brought into register to complete the capsules. Although satisfactory results can be achieved this requires complex and expensive machinery and very careful control. A further difficulty is that the formation of the capsule halves from the ribbons leaves a net of waste gelatine which it is difficult to reuse because of contamination during the capsule-forming operation.

In another method molten gelatine is fed through an annular passage surrounding a central passage through which liquid fill material is fed. The limitations of this method are that only small-sized round capsules containing liquids can be made.

In accordance with the present invention there is provided a method of forming and filling capsules of thermoplastic material comprising the steps of extruding a tube of the thermoplastic material, sealing together the walls of the tube at a point spaced from the open end of the tube, filling the container thus formed through the open end, sealing the open end, and shearing off the extruded tube adjacent the said point to present a fresh open end.

Apparatus for carrying out this method comprises a device for extruding a tube of thermoplastic material from an extrusion orifice, two sets of heated dies for sealing together the walls of the extruded tube at spaced points to form a capsule from the portion of the tube between the sets of dies, a filling mechanism aligned with the extruded tube for feeding fill material into its open end, and a shearing device positioned adjacent the extrusion orifice to trim off the end of the tube to present a fresh open end.

A supporting guide for the extruded tube may be arranged between the two sets of heated dies. The extrusion device when the capsules are being formed from gelatine may comprise a tank for containing molten gelatine, a cooled extrusion orifice in the lid of the tank, and means for applying pneumatic pressure to the gelatine in the tank to force it upwards through the extrusion orifice.

The invention will now be described in more detail with the aid of an example illustrated in the accompanying drawing, the single figure of which is a schematic vertical section of apparatus in accordance with the invention for the formation of filled gelatine capsules.

Molten gelatine 10 is contained in a heated tank 11 having a cover 12 in which an annular extrusion orifice 13 is formed between a circular opening in the cover and a core member 14 supported on the floor of the tank. The core member 14 is cooled by circulation of a chilled medium through passages 15 and is insulated from the gelatine in the tank 11 by an insulating layer 16. The cover 12 is cooled in the region of the extrusion orifice 13 by the circulation of a chilled medium through passages 17. The purpose of this cooling is to stiffen quickly the extruded tube. Lubricant is supplied to the extrusion orifice 13 by passages 18 in the core member 14 and passages 19 in the cover 12.

The tank 10 is fitted with an internal partition 20 extending downwards from the cover 12. Air is supplied under pressure through a valve 21 to one side of the partition in order to force gelatine upwards through the extrusion orifice 13 which is located on the other side of the partition 20.

Above the extrusion orifice 13 are mounted two heated dies 22 and 23 which are mounted on slides 24 and 25 respectively for movement transversely of the axis of the extrusion orifice. The dies 22 and 23 are of semicircular cross section and, after the extrusion of a length of tube 26, are brought together to seal the walls of the tube together and sever the end of the tube as shown at 27 in the drawing, thus forming one end of a capsule. The tube 26 is supported by a pair of semicircular guides 28 and 29 which are separable transversely of the tube and are flared at their lower ends to guide the end of the tube as it is extruded.

A feed orifice 30 in a plate 31 is aligned with the extrusion orifice 13 for feeding charges of fill material into the partly formed capsules after the lower end has been closed at 27. The charges are formed by filling chambers 32 in a turret 33 from a hopper 34. Rotation of the turret brings a filled chamber 32 into register with the feed orifice 30 and the charge is discharged by a plunger 35. After filling of the capsule the upper end is sealed by means of a second pair of heated dies 36 and 37 which are movable transversely to the tube 26 and are semicircular in section to form a rounded end on the capsule.

The upper end of the extruded tube at 27 is closed by the operation of the dies 22 and 23. In order to present an open end for the filling of the next capsule to be formed, a shear blade 38 immediately adjacent the extrusion orifice 13 cuts away the closed end 39 after the dies 22 and 23 have been closed.

It will be apparent that various modifications can be made in the apparatus. The gelatine may be extruded by the mechanical action of a piston or plunger rather than by pneumatic pressure. The lubricant may in some cases also serve as the coolant. A single gelatine container may have a number of extrusion orifices each with its own sealing, filling, and trimming attachments so that a number of capsules may be produced simultaneously.

The diameter of the extruded tube and thereby the diameter of the filled capsule may be changed by changing the size of the orifice. The wall thickness of the extruded tube and the filled capsule is determined by the relative diameters of the core member and the opening in the cover. The length of the capsule may be varied by changing the spacing between the sets of dies and the fill volume can thus be adjusted.

The oblong capsules produced by the method described will be more regular in shape than those formed by sealing separate capsule halves formed on die rolls and will have a better appearance because the seals come only at the ends. The loss of gelatine in the formation of the capsule consists only of the ends trimmed by the shearing device and is thus less than the waste net from ribbons of gelatine used to mold capsules.

While the filling mechanism described is designed primarily for powders, it is possible to fill the capsules with liquids and pastes by the use of suitable filling mechanisms.

I claim:

1. Apparatus for forming and filling capsules of thermoplastic material, comprising:
    means for upwardly extruding a tube of thermoplastic material, said tube having an open upper end therein;
    cooling means associated with said extruding means for cooling the extended tube;
    first sealing means disposed above the extruding means for sealing together the walls of the extruded tube;
    filling means disposed above said sealing means for delivering fill material into the open upper end of said extruded tube; and
    second sealing means disposed between said first sealing means and said filling means for sealing said open end.

2. Apparatus according to claim 1, wherein said first sealing means seals together the walls of the extruded tube adjacent the lower end thereof and closes the upper end of the next adjacent extruded tube.

3. Apparatus according to claim 1, wherein said first sealing means seals together the walls of the extruded tube adjacent the lower end thereof and closes the upper end of the next adjacent extruded tube; and includes shearing means disposed between the extruding means and the first sealing means for shearing the upper end of said next adjacent extruded tube to present a fresh open end therein.

4. Apparatus according to claim 3, wherein said extruding means comprises an extrusion orifice, said first and second sealing means each comprise a set of heated dies for shaping the upper and lower ends of said extruded tube and said shearing means comprise a shearing device located adjacent the extrusion orifice for shearing the upper end of said next adjacent extruded tube.

5. Apparatus as claimed in claim 1, including a supporting guide for guiding the extruded tube, said supporting guide being located between said first and second sealing means.

6. Apparatus as claimed in claim 1, in which the extruding means includes an extrusion orifice and a tank for containing said thermoplastic material, said tank having a cover in which the extrusion orifice is located, said extrusion orifice being defined by the spacing between the wall of the opening in the cover and a core member supported within the tank.

7. Apparatus as claimed in claim 6 including means for applying pneumatic pressure to the material in the tank in such a manner as to force it through the extrusion orifice.

8. Apparatus as claimed in claim 6, wherein said cooling means includes means defining passages adjacent the internal and external surfaces of said extrusion orifice for permitting a circulation of cooling fluid through the parts adjacent the extrusion orifice.

9. Apparatus as claimed in claim 6, including means defining passages for permitting a supplying of lubricant to the internal and external surfaces of the extrusion orifice.

10. Apparatus as claimed in claim 1, wherein the filling means comprises a rotary turret having charge chambers which are carried in succession from a loading station having a hopper arranged to fill the charge chamber to an unloading station in which the charge chamber registers with a feed orifice aligned with the extruded tube and through which the charge is discharged into the extruded tube.